A. T. LINDERMAN.
Circular Seed-Drill and Cultivator.
No. 226,178. Patented April 6, 1880.
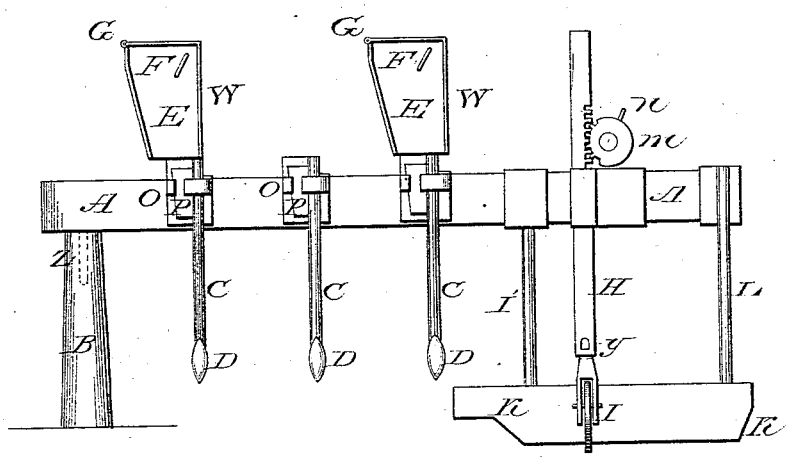
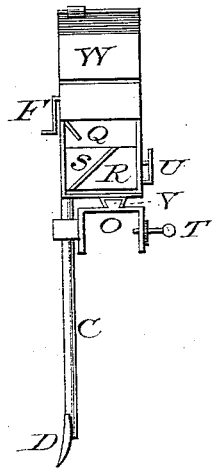
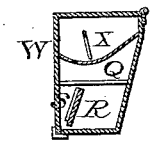
Witnesses:
A. C. Bradley
O. S. Wheeler
Inventor:
A. T. Linderman
By his atty
W. P. Bell

UNITED STATES PATENT OFFICE.

ALBERT T. LINDERMAN, OF WHITEHALL, MICHIGAN.

CIRCULAR SEED-DRILL AND CULTIVATOR.

SPECIFICATION forming part of Letters Patent No. 226,178, dated April 6, 1880.

Application filed February 10, 1879.

*To all whom it may concern:*

Be it known that I, ALBERT T. LINDERMAN, of Whitehall, in the county of Muskegon and State of Michigan, have invented a new and useful apparatus for forming circular beds and the paths surrounding them, and for marking, planting, and cultivating the same, called by me a "Circular Seed-Drill and Cultivator," of which the following is a specification.

The invention consists in the construction of a combined cultivating seeding-machine pivoted to a central post or standard, so as to be capable of revolving around it, in order that beds for flowers and other plants may be marked out, planted, and cultivated in concentric circular rows, all in the manner hereinafter more specifically set forth.

The invention consists of a horizontal bar having a pin at one end, which sets loosely into a hole in the top of a stake driven firmly into the ground in the center of the bed or plat to be planted. The other end of the bar rests upon an adjustable standard provided with a caster-wheel at the lower end to roll upon the ground. This bar is intended to hang on the center post and have its outer end moved around the post, thus passing the bar over the ground to be operated upon.

Attached to the bar and depending therefrom are markers, drills, or cultivators, which are adjustable both perpendicularly and horizontally, and as the outer end of the bar is moved around the depending parts do their work in circles around the center post. It is within the scope of my invention to establish these center posts at various points in a field, yard, or garden, and throw the ground into circular beds, and have the various products planted and cultivated in circular rows throughout. A scraper is attached to the outer end of the bar to assist in forming the beds and to smooth the paths around them.

In the accompanying drawings, in which similar letters of reference indicate like parts, Figure 1 is a front view of my invention, showing the depending parts with and without the drill attachment, the scraper, and supporting standard and wheel. Fig. 2 is a view of the drill attachment with cover raised. Fig. 3 is a sectional side view of the drill attachment, and Fig. 4 is a view of the corrugated cone for spreading the seed in the drill attachment.

The center post, B, should be of such size as to hold the bar in place, and should be set firmly into the ground, and has a hole bored into its upper end to receive the pin from the bar A, and should be in the center of the plat intended to be cultivated.

A A A A is a strong bar about four inches square when made of wood, which is the most suitable material, and bound with iron on the outer end. It is provided with a pin, Z, which sets into the hole in the post B in such a manner as to allow the bar to be easily turned around the post.

K K is a scraper intended to assist in forming and keeping in shape the bed and walks, and is attached to the supporters L and L', which are fastened to the bar A, the inner support, L', slanting backward from the bar downward, so as to make the scraper K K set at an angle to the bar, and thus carry the loose earth toward the bed.

D D D are three markers or drill-teeth attached to the hollow standards C C C. These standards are inserted into hooks on the front sides of the clamps O O O, and fastened by the wedges P P P, and thus may be raised or lowered at pleasure. The clamps O O O are of such size as to fit loosely on the bar A, and are held in place by the set-screws shown by T, Fig. 2, and hence may be readily set at any point on the bar. These standards may be removed and others inserted having cultivator-teeth attached to them, such teeth being in any common form and made adjustable to rows of different widths; or cultivator-teeth may be attached to these standards.

E E are drill attachments provided with covers W W, in which the hopper has a small aperture, *x*, at the lower part for the passage of seed. This hole is covered by an agitator, which is operated by the crank shown in Fig. 1 by F.

Q is a conical-shaped corrugated piece of metal fastened into the drill attachment, on which the seed falls and is spread to drop on the movable apron R, provided with guide S, which carries the seed to a hole in the bottom of the attachment, which is directly over the hollow standard C, through which it falls to the ground.

The drill attachment E is fastened to the clamp O by means of the dovetail slide V.

It is intended to have the cranks F F connected by a bar, (not shown in the drawings,) so as to be operated by one movement of the hand.

The apron R is movable, hung or pivoted at the bottom, and can be set at any angle by the elastic crank U, which rests against a notched guide provided with a dial on the body of the drill attachment. The object of this movable apron is to regulate the amount of seed, less being required toward the center post than toward the outer side of the bed, and the position of the apron at various distances from the center post to catch the requisite amount of seed is indicated on the dial. The more perpendicular this apron stands the less seed will fall upon it from the distributer Q. Such portion of the seed as falls behind the apron may be removed from time to time.

H is an adjustable standard, provided with a caster-wheel, I, and may be raised or lowered by the cog-wheel M running in corresponding cogs on the standard. The cog-wheel is set on a shaft turned by a crank, $r$, and held in position by a pawl and ratchet. Y is a hook in standard H, to which a horse may be attached to operate the invention.

The beds to be formed by the use of my invention should be about twenty-four feet in diameter to be cultivated by a horse, or about eight feet in diameter to be cultivated by hand.

The center post should remain throughout the season in one place, and be used for marking or drilling, and also for cultivating, and for ordinary use should be one foot high.

One especial advantage claimed by me is, that by this invention I am enabled to cultivate very closely to the rows of plants without danger of injury, the bar A holding all depending parts rigidly in place. The bar A might be made of a length equal to the diameter of the bed, with the post B supporting the center, and have depending parts on both ends; but I do not deem the same as well adapted to the end described as the device above set forth.

Various forms of teeth for cultivation may be used, such as plows, shovel-plows, cultivator-teeth, rakes, and scarifiers; but as these devices are old I make no claim to their use, save in connection with my invention.

The hook holding the standard C, instead of being fastened rigidly, as above described, may be hinged to the clamp O and kept in position by a spring attached to the back side of the bar A, so as to enable it to give way if the tooth should strike a root, stone, or other obstacle, and yet be pressed back into place after the obstacle is passed.

The number of standards C to be used on a single device will, of course, depend on the work to be done and width of the rows.

What I claim is—

1. A combined seeder and cultivator attached at one end by a swivel to a fixed post or standard, around which it is revolved for the purpose of planting seeds and cultivating plants in concentric circular rows, all substantially in the manner described.

2. The bar A, provided with pins Z, in combination with post B, standard C C C, clamps O O, drill attachment E, teeth D, scraper K, and supporter H, as and for the purposes described.

ALBERT T. LINDERMAN.

Witnesses:
W. A. PHELPS,
B. F. EMERY.